(12) United States Patent
Troia et al.

(10) Patent No.: US 10,594,666 B2
(45) Date of Patent: Mar. 17, 2020

(54) SECURE MESSAGE INCLUDING A VEHICLE PRIVATE KEY

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 233 days.

(21) Appl. No.: 15/846,982

(22) Filed: Dec. 19, 2017

(65) Prior Publication Data

US 2019/0190893 A1 Jun. 20, 2019

(51) Int. Cl.
| | | |
|---|---|---|
| *H04L 29/06* | (2006.01) | |
| *H04W 4/44* | (2018.01) | |
| *G06N 3/063* | (2006.01) | |
| *G05D 1/00* | (2006.01) | |
| *H04L 9/06* | (2006.01) | |

(52) U.S. Cl.
CPC ....... *H04L 63/0428* (2013.01); *G05D 1/0088* (2013.01); *G06N 3/063* (2013.01); *H04L 9/0643* (2013.01); *H04L 63/123* (2013.01); *H04L 63/1441* (2013.01); *H04W 4/44* (2018.02)

(58) Field of Classification Search
CPC .............. H04L 63/0428; H04L 9/0643; H04L 63/1441; H04W 4/44; G05D 1/0088; G06N 3/063
See application file for complete search history.

(56) References Cited

U.S. PATENT DOCUMENTS

| | | | |
|---|---|---|---|
| 6,976,163 B1 * | 12/2005 | Hind ..................... | G06F 21/572 713/1 |
| 7,069,452 B1 * | 6/2006 | Hind ..................... | G06F 21/572 713/1 |
| 7,899,610 B2 | 3/2011 | McClellan | |
| 8,126,642 B2 | 2/2012 | Trepagnier et al. | |
| 9,253,200 B2 * | 2/2016 | Schwarz ............... | G06F 3/0484 |
| 9,331,989 B2 | 5/2016 | Dover | |
| 9,569,622 B2 * | 2/2017 | Dover .................. | G06F 21/575 |
| 9,613,214 B2 | 4/2017 | Dover | |
| 9,787,800 B2 * | 10/2017 | e Costa .................. | H04L 67/34 |
| 9,916,151 B2 * | 3/2018 | Ye .............................. | G06F 8/65 |

(Continued)

FOREIGN PATENT DOCUMENTS

WO 2017147207 A1 8/2017

OTHER PUBLICATIONS

International Search Report and Written Opinion from related international application No. PCT/US2018/063793, dated Mar. 8, 2019, 13 pages.

*Primary Examiner* — Calvin Cheung
(74) *Attorney, Agent, or Firm* — Brooks, Cameron & Huebsch, PLLC (57) ABSTRACT

An example apparatus comprises a memory resource configured to store a private key associated with a vehicle and store a data matrix comprising data corresponding to operation of the vehicle. The apparatus may further include a processing resource configured to generate a first secure message comprising data corresponding to the vehicle, transmit the first secure message, receive a second secure message comprising an updated data matrix, and update the data matrix based, at least in part, on the updated data matrix.

26 Claims, 5 Drawing Sheets

(56) References Cited

U.S. PATENT DOCUMENTS

| | | | |
|---|---|---|---|
| 2003/0081785 A1* | 5/2003 | Boneh | H04L 9/0847 |
| | | | 380/277 |
| 2009/0217043 A1 | 8/2009 | Metke et al. | |
| 2012/0155636 A1 | 6/2012 | Muthaiah | |
| 2013/0029595 A1* | 1/2013 | Widmer | H04B 5/0031 |
| | | | 455/39 |
| 2013/0046972 A1* | 2/2013 | Campagna | H04L 9/0841 |
| | | | 713/156 |
| 2013/0111212 A1* | 5/2013 | Baltes | G06F 21/57 |
| | | | 713/176 |
| 2013/0159717 A1* | 6/2013 | Rabadi | G06F 21/572 |
| | | | 713/176 |
| 2013/0275761 A1* | 10/2013 | Catsburg | H04L 9/3247 |
| | | | 713/176 |
| 2014/0195100 A1 | 7/2014 | Lundsgaard et al. | |
| 2015/0033016 A1* | 1/2015 | Thornton | H04L 9/0825 |
| | | | 713/171 |
| 2015/0121071 A1 | 4/2015 | Schwarz et al. | |
| 2015/0270975 A1* | 9/2015 | Buckley | H04L 63/126 |
| | | | 713/156 |
| 2016/0323386 A1* | 11/2016 | Wideman | H04L 67/12 |
| 2017/0195459 A1 | 7/2017 | E Costa et al. | |
| 2017/0214744 A1 | 7/2017 | Neves et al. | |
| 2017/0244565 A1* | 8/2017 | Bronk | H04L 63/126 |
| 2017/0286675 A1* | 10/2017 | Shin | G06F 1/12 |
| 2017/0346542 A1 | 11/2017 | Neves et al. | |
| 2017/0358204 A1 | 12/2017 | Modica et al. | |
| 2018/0217942 A1* | 8/2018 | Fons | G06F 12/1408 |
| 2018/0337899 A1* | 11/2018 | Becker | H04L 63/0457 |

\* cited by examiner

SECURE MESSAGE INCLUDING A VEHICLE PRIVATE KEY

TECHNICAL FIELD

The present disclosure relates generally to semiconductor memory and methods, and more particularly, to apparatuses and methods related to a secure message including a vehicle private key.

BACKGROUND

In conventional motor vehicles (e.g., automobiles, cars, trucks, buses, etc.), the driver is critical to operating the vehicle's control system. For example, the driver of a conventional motor vehicle makes decisions regarding the safe operation of the vehicle. Such decisions may include decisions related to the speed of the vehicle, steering of the vehicle, obstacle and/or hazard recognition, and obstacle and/or hazard avoidance. However, a driver's ability to make these decisions and operate the vehicle's control system may be limited in some situations. For example, driver impairment, fatigue, attentiveness, and/or other factors such as visibility (e.g., due to weather or changes in terrain) may limit a driver's ability to safely operate a conventional motor vehicle and/or its control system.

In order to alleviate the deficiencies resulting from driver operation of a conventional motor vehicle, various manufacturers have experimented with autonomous vehicles. While autonomous vehicles may allow for a reduction in issues that may arise as a result of the driver's ability to operate the conventional motor vehicle becoming lessened, autonomous vehicles have their own shortcomings.

For example, autonomous vehicles may rely on various sensors and/or cameras to determine a speed at which to operate the vehicle, steering of the vehicle, obstacle and/or hazard recognition, and obstacle and/or hazard avoidance. Such sensors and/or cameras may fail or may require additional information to safely operate the autonomous vehicle from a host computing device responsible for providing updates to the autonomous vehicle. If the sensors and/or cameras fail or do not receive adequate information to continue to operate the autonomous vehicle, the autonomous vehicle may cease to operate or, in worse case scenarios, fail to provide adequate obstacle and/or hazard recognition, and obstacle and/or hazard avoidance, which may result in injury or death to passengers in the autonomous vehicle.

DETAILED DESCRIPTION

The present disclosure includes apparatuses and methods related to a secure message including a vehicle private key. An example apparatus comprises a memory resource configured to store a private key associated with a vehicle and store a data matrix comprising data corresponding to operation of the vehicle. The apparatus may further include a processing resource configured to generate a first secure message comprising data corresponding to the vehicle, transmit the first secure message, receive a second secure message comprising an updated data matrix, and update the data matrix based, at least in part, on the updated data matrix.

In some approaches, autonomous vehicles may include one or more artificial intelligence components. These components may be configured to perceive the surrounding environment and take actions to maximize a chance of success of completing a particular goal. In autonomous vehicles, the particular goal may be operating the autonomous vehicle safely. For example, the goal may be to operate the autonomous vehicle at a safe speed, safely control steering of the autonomous vehicle, and/or providing obstacle and/or hazard recognition, and/or obstacle and/or hazard avoidance. As used herein, an "autonomous vehicle" is a vehicle such as a car, truck, bus, motorcycle, moped, all-terrain vehicle, military vehicle, tank, etc. in which at least a portion of the decision-making and/or control over vehicle operations is controlled by computer hardware and/or software, as opposed to a human operator.

The artificial intelligence component(s) may include one or more neural networks. Neural networks may allow for an algorithm to be trained over time to determine an output response based on input signals. For example, over time, a neural network may essentially learn to better maximize the chance of completing a particular goal. This may be advantageous in machine learning applications because the neural network may be trained over time with new data to achieve better maximization of the chance of completing the particular goal. In autonomous vehicle applications, a neural network may be trained over time to improve operation of the autonomous vehicle, for example.

In some embodiments, a set of data used for training (e.g., a training data set) may be analyzed off-line by a host computing device that is located in a different geophysical location than the autonomous vehicle. For example, a training data set may be analyzed at a server farm or software defined data center (e.g., a cloud computing environment) that is located remotely from the autonomous vehicle. However, in some approaches, since the data to be used for training can be transferred from the autonomous vehicle to the host computing device (and new (e.g., updated) data must be sent back to the autonomous vehicle), the data may be susceptible to malicious attacks when en route from the autonomous vehicle to the host computing device or vice versa.

For example, because operation of the control system in an autonomous vehicle may be wholly or partly handled by control circuitry, autonomous vehicles may be susceptible to malicious attacks from third parties. In some approaches, updates to an autonomous vehicle's control circuitry (e.g., firmware updates, object recognition updates, etc.), for example, may be susceptible to man-in-the-middle attacks in which a nefarious actor secretly replays and/or alters communications between the autonomous vehicle and a host computing device responsible for providing updates to the autonomous vehicle. This may lead to unsafe situations in which a malicious entity may gain control over all or a portion of operation of the autonomous vehicle.

In contrast, embodiments disclosed herein may allow for secure delivery and receipt of critical data between the autonomous vehicle and the host computing device. The data may include updates to the firmware of the autonomous vehicle, newly trained data sets for operation of the autonomous vehicle's neural network, data collected by the autonomous vehicle such as data corresponding to objects that are unrecognizable to the autonomous vehicle, and the like.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
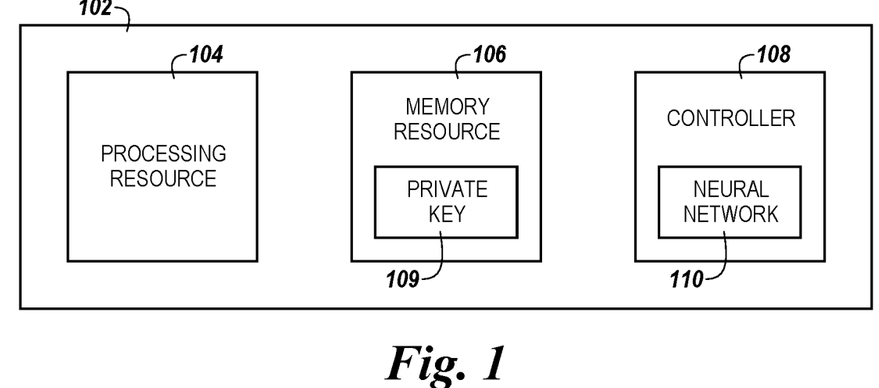
FIG. 1 is a block diagram of an apparatus in the form of a control unit in accordance with a number of embodiments of the present disclosure.

FIG. 1 is a block diagram of an apparatus 100 in the form of a control unit 102 in accordance with a number of embodiments of the present disclosure. As used herein, a control unit 102, processing resource 104, memory resource 106, controller 108, and/or neural network 110 might also be separately considered an "apparatus."

As shown in FIG. 1, apparatus 100 includes a control unit 102 (e.g., an artificial intelligence electronic control unit), which includes processing resource 104, memory resource 106, and controller 108. The controller 108 further includes a neural network 110. The processing resource may be a central processing unit (CPU), semiconductor based microprocessor, integrated circuit based microprocessor, vector processor, and/or other hardware device(s) suitable for retrieval and execution of instructions stored in the memory resource 106.

The memory resource 106 may include volatile and/or non-volatile memory configured to store instructions executable by the processing resource 104. For example, the memory resource 106 may include flash memory, read-only memory (ROM), programmable read-only memory (PROM), erasable programmable read-only memory (EPROM), electrically erasable programmable read-only memory (EEPROM), dynamic random-access memory (DRAM), static random-access memory (SRAM), and/or other suitable storage media.

The memory resource 106 may store a private key 109 associated with an autonomous vehicle. The private key 109 may be based, at least in part, on a vehicle identification number (VIN) associated with the vehicle. In general, each vehicle manufactured has a unique VIN assigned thereto when the vehicle is being manufactured. The VIN may be used to identify a vehicle, among other things.

As discussed above, the private key 109 can be based, at least in part, on the VIN. For example, the private key 109 can be generated such that it is associated with the VIN to facilitate identification of a particular vehicle. Similar to the VIN, the private key may be unique to the vehicle to which it is assigned. In some embodiments, the private key 109 can be stored in the memory resource 106 when the vehicle is manufactured. Embodiments are not so limited; however, and the private key may be stored in a data matrix storage location (e.g., data matrix storage 312 illustrated in FIG. 3, herein).

The private key 109 may not be read or modified. For example, the private key 109 may not be read intentionally (e.g., by a person with access to the vehicle such as a vehicle owner, mechanic, or other third party), but the private key 109 may be used by the autonomous vehicle and/or a host in communication with the autonomous vehicle. As a result, the integrity of the private key 109 can preserved. In some embodiments, the private key 109 may be used to generate a message authentication code as part of securing a communication between an autonomous vehicle and a host computing device, as described in more detail, herein. In some embodiments, the private key 109 may not be transferred from the autonomous vehicle (e.g., the private key 109 may not be transferred across a bus providing a signal path from the control unit to other circuitry in the autonomous vehicle).

In some embodiments, the private key 109 may be used to ensure that changes made to the vehicle that are unauthorized are not allowed. For example, the private key 109 may be assigned to replacement parts to be used in the autonomous vehicle in order to prevent the use of unauthorized vehicle modification.

The controller 108 can be configured to control operation of the control unit 102. In some embodiments, the controller 108 can decode signals received to the control unit 102 that are used to control operation of the control unit 102. The controller 108 can be a state machine, sequencer, or some other type of controller, and can include hardware and/or firmware (e.g., microcode instructions) in the form of an application specific integrated circuit (ASIC), field programmable gate array, etc. In some embodiments, the controller 108 can control generation and decoding of secure messages transmitted between the control unit 102 and a host computing device (e.g., host computing device 203 illustrated in FIG. 2).

The controller 108 can include neural network 110. The neural network 110 is configured to learn (e.g., progressively improve performance) to do tasks by considering examples. In some embodiments, training data may be provided to the neural network 110 to facilitate learning by the neural network 110. In an autonomous vehicle deployment, as described in more detail herein, the neural network 110 may learn tasks such as how to steer the autonomous vehicle and how fast to operate the autonomous vehicle, as well as tasks such as obstacle and/or hazard recognition, and/or obstacle and/or hazard avoidance.

In some embodiments, the neural network 110 may employ deep learning to utilize data representations to improve its performance of tasks such as how to steer the autonomous vehicle and how fast to operate the autonomous vehicle, as well as tasks such as obstacle and/or hazard recognition, and/or obstacle and/or hazard avoidance. For example, the neural network 109 may be a deep neural network such as a feedforward deep neural network, a recurrent neural network, and/or a convolutional deep neural network.

Figure 2:
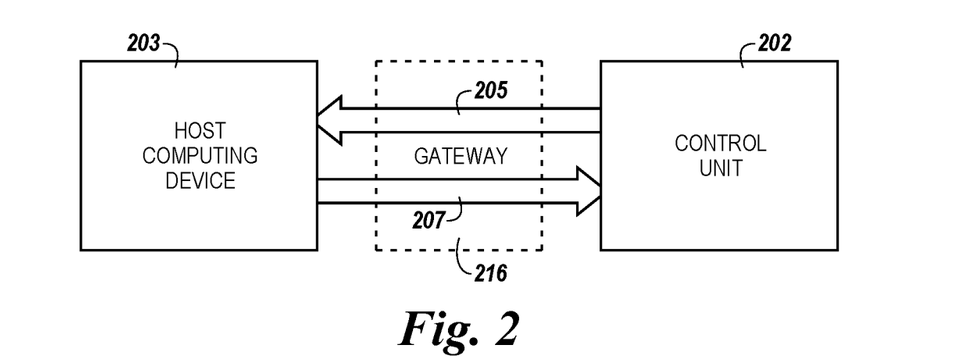
FIG. 2 is a block diagram of a system including a host computing device and a control unit in accordance with a number of embodiments of the present disclosure.

FIG. 2 is a block diagram of a system including a host computing device 203 and a control unit 202 in accordance with a number of embodiments of the present disclosure. As shown in FIG. 2, the control unit 202 and the host computing device 203 may be configured to exchange communications via communication paths 205 and 207. In some embodiments, communication path 205 may be utilized to transfer communications from the control unit 202 to the host computing device 203, and communication path 207 may be utilized to transfer communications from the host computing device 203 to the control unit 202. Communication paths 205 and/or 207 may represent paths over which wireless communications between the control unit 202 and the host computing device 203 may be transferred.

In some embodiments, the system may include a gateway 216. As used herein, the gateway 216 may be a network gateway configured to interface between devices that use different protocols. For example, a protocol used by the control unit 202 may be different than a protocol used by the host computing device 203, and the gateway 216 may be configured to facilitate communication between the control unit 202 and the host computing device 203. In some embodiments, the gateway 216 includes hardware configured to convert between the protocols used by the control unit 202 and the host computing device 203.

Figure 3:
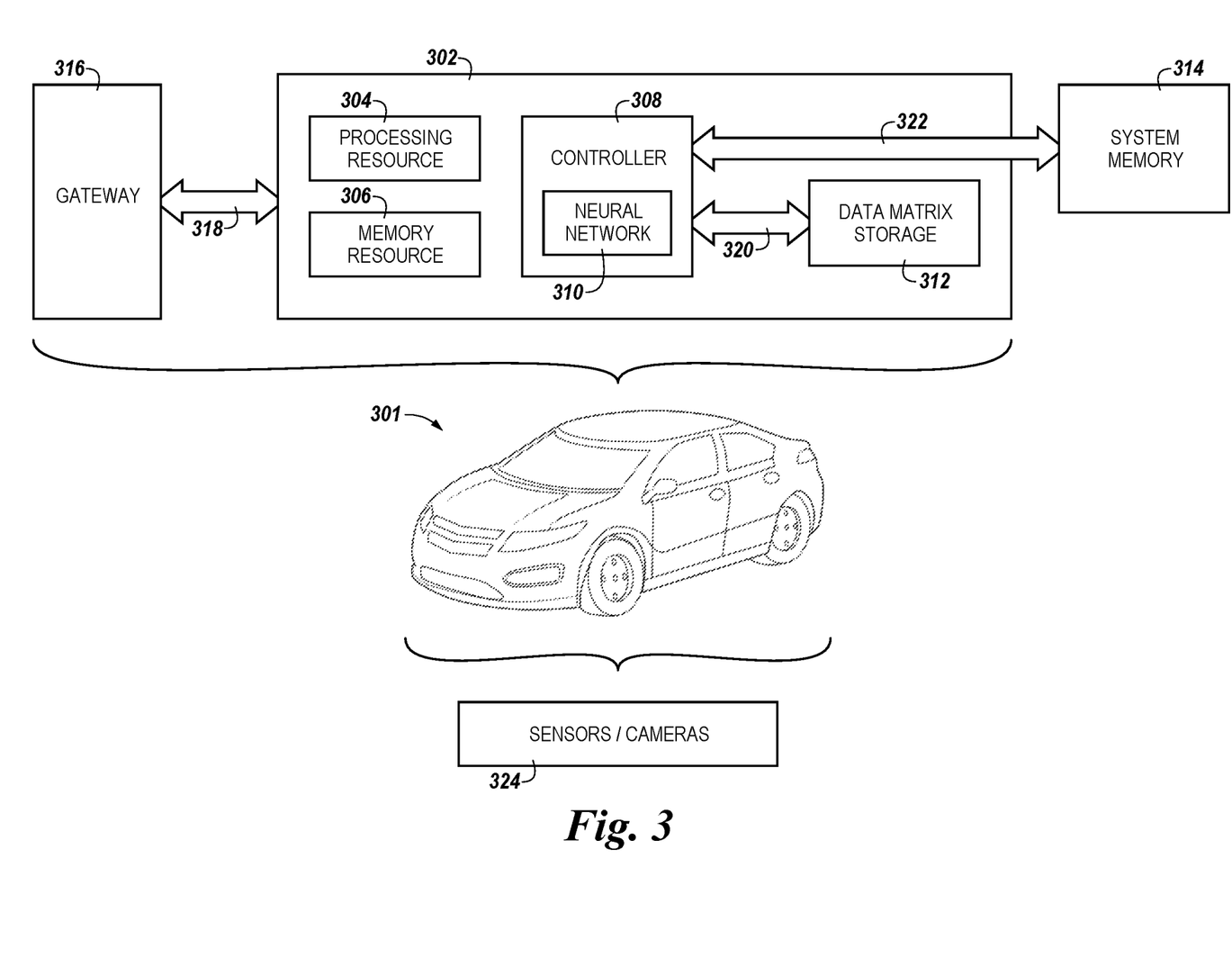
FIG. 3 is a diagram of a system in the form of an autonomous vehicle in accordance with a number of embodiments of the present disclosure.

The gateway 216 may be configured as an internet gateway, cloud gateway, internet of things gateway, server, or other suitable gateway for facilitating communication between the control unit 202 and the host computing device 203. In some embodiments, the gateway may be disposed in the autonomous vehicle as shown in FIG. 3, or the gateway may be disposed in or near the host computing device 203 (e.g., the gateway may be remote to the autonomous vehicle).

The host computing device 203 may include hardware configured to perform particular tasks (e.g., a physical computing device, server, etc.), and/or the host computing device 203 may be deployed as part of a software defined data center (e.g., as a virtualized computing device). In some embodiments, the host computing device 203 may be located in a geophysically different location than the control unit 202, which may be disposed in an autonomous vehicle as described in more detail in connection with FIG. 3, herein. The host computing device 203 may be maintained by the manufacturer of the autonomous vehicle.

In some embodiments, the host computing device 203 is configured to receive communications from the control unit 202 via communication path 205. The communications may include data collected by the autonomous vehicle, one or more authentication protocols, and/or a message authentication code, as described in more detail in connection with FIG. 5A, herein. In some embodiments, the one or more authentication protocols may include an anti-replay protocol (e.g., an anti-replay mechanism) while the message authentication code may comprise a hash-based message authentication code (HMAC). Embodiments are not limited to HMAC; however, and the one or more authentication protocols may include other types of message authentication codes, message integrity codes, cryptographic functions (e.g., cryptographic hash functions), or other suitable authentication protocols. As a result, in some embodiments, the communication transmitted from the control unit 202 to the host computing device 203 may be a secure message (e.g., a cryptographic message). The data collected by the autonomous vehicle may correspond to data collected via sensors and/or cameras deployed on or in the autonomous vehicle, as described in more detail in connection with FIG. 3, herein.

Upon receipt of the communication from the control unit 202, the host computing device 203 may be configured to decrypt the communication received via communication path 205. Once the communication has been decrypted, the host computing device 203 may be configured to analyze the data collected by the autonomous vehicle. In some embodiments, the host computing device 203 is configured to generate an updated set of data based on the analysis of the received data collected by the autonomous vehicle.

The host computing device 203 may be further configured to transmit the updated set of data based on the analysis back to the control unit 202 via communication path 207. In some embodiments, the host computing device 203 may be configured to transmit the updated data, one or more authentication protocols, and/or a message authentication code with the updated data to the control unit 202, as described in more detail in connection with FIG. 5B, herein. The message authentication code may be a HMAC and/or other message authentication code (MAC) based on the private key, and in some embodiments, may be the same MAC based on the private key that was transmitted from the control unit 202 to the host computing device 203 with the collected data. Embodiments are not so limited; however, and the message authentication code transmitted from the host computing device 203 may be different than the message authentication code transmitted by the control unit 202. The authentication protocol may include an anti-replay protocol which may be different than an anti-replay protocol generated by the control unit 203. As a result, in some embodiments, the communication transmitted from the host computing device 203 to the control unit 202 may be a secure message.

In some embodiments, the control unit 202 is configured to generate a new message authentication code each time the control unit 202 generates a communication to transmit to the host computing device 203. Similarly, in some embodiments, the host computing device 203 is configured to generate a new message authentication code each time the host computing device 203 generates a communication to transmit to the control unit 202.

FIG. 3 is a diagram of a system in the form of an autonomous vehicle 301 in accordance with a number of embodiments of the present disclosure. As shown in FIG. 3, the autonomous vehicle 301 may include control unit 302, gateway 316, and sensors/cameras 324. The gateway 316 may be network gateway as described in connection with FIG. 2, herein. As shown in FIG. 3, the control unit 302 includes a processing resource 304, memory resource 306, controller 308 (which further includes neural network 310), and a data matrix storage location 312.

The control unit 302 is configured to communicate with the gateway 316 via communication path 318. Communication path 318 may represent a portion of communication paths 205 and 207 illustrated in FIG. 2. For example, communication path 318 may represent the portion of communication path 205 that is used to transmit communications from the control unit 302 to the host computing device (e.g., host computing device 203 illustrated in FIG. 2) as well as the portion of communication path 207 that is used to receive communications at the control unit 302 from the host computing device.

The controller 308 may be communicatively coupled to the data storage matrix 312 via communication path 320, and may be communicatively coupled to system memory 314 via communication path 322. In some embodiments, system memory 314 can include RAM, ROM, SRAM, DRAM, PROM, EPROM, EEPROM, flash memory, or any other suitable computer memory, as well as combinations thereof. The system memory 314 may be used as at least a portion of the memory of control unit 302. In some embodiments, a private key such as private key 109 illustrated in FIG. 1 may be stored in the memory resource 306 or the system memory 314. As discussed in connection with FIG. 1, the private key may be generated such that it associated with the vehicle 301 (e.g., it may be associated with the VIN of the vehicle 301).

The autonomous vehicle 301 may include a plurality of sensors/cameras 324. As will be appreciated, the sensors and/or cameras 324 can be mounted on the vehicle 301 (e.g., on the front, side, rear, top, etc. of the vehicle 301), and/or the sensors/cameras 324 may be disposed inside the vehicle (e.g., on an interior portion of the windshield, in the lights of the vehicle 301, etc.). The sensors/cameras 324 may be configured to collect data as the autonomous vehicle 301 is being operated. For example, the sensors/cameras 324 may be configured to collect data corresponding to objects on the road or along the roadside as the autonomous vehicle 301 is being operated and/or the sensors/cameras 324 may be configured to collect data corresponding to operation of the autonomous vehicle 301. In some embodiments, the data collected by the sensors/cameras 324 may include, sensor input, sensor outputs, audio data, image data, etc.

During operation of the autonomous vehicle 301, some objects detected by the sensors/cameras 324 may be un-recognized by the autonomous vehicle 301. For example, during operation of the autonomous vehicle 301, the sensors/cameras 324 may detect objects that are not recognized by the neural network 310 of the autonomous vehicle 301. In order to resolve such objects, the control unit 302 may be configured to send, as part of a communication, data corresponding to the un-recognized objects to a host computing device (e.g., host computing device 203 illustrated in FIG. 2) for analysis.

In some embodiments, the data matrix storage 312 may be configured to store a data matrix. The data matrix may include information relating to operation of the autonomous vehicle 301. For example, the data matrix stored in the data matrix storage 312 may include learned operation parameters of the autonomous vehicle. In some embodiments, the data matrix stored in the data matrix storage 312 may be a weighing matrix. As used herein, a "weighing matrix" is a multi-dimensional matrix of m elements by n elements with n and m integer numbers stored therein. In some embodiments, the weighing matrix may include parameters related to operation of the autonomous vehicle 301.

Figure 4:
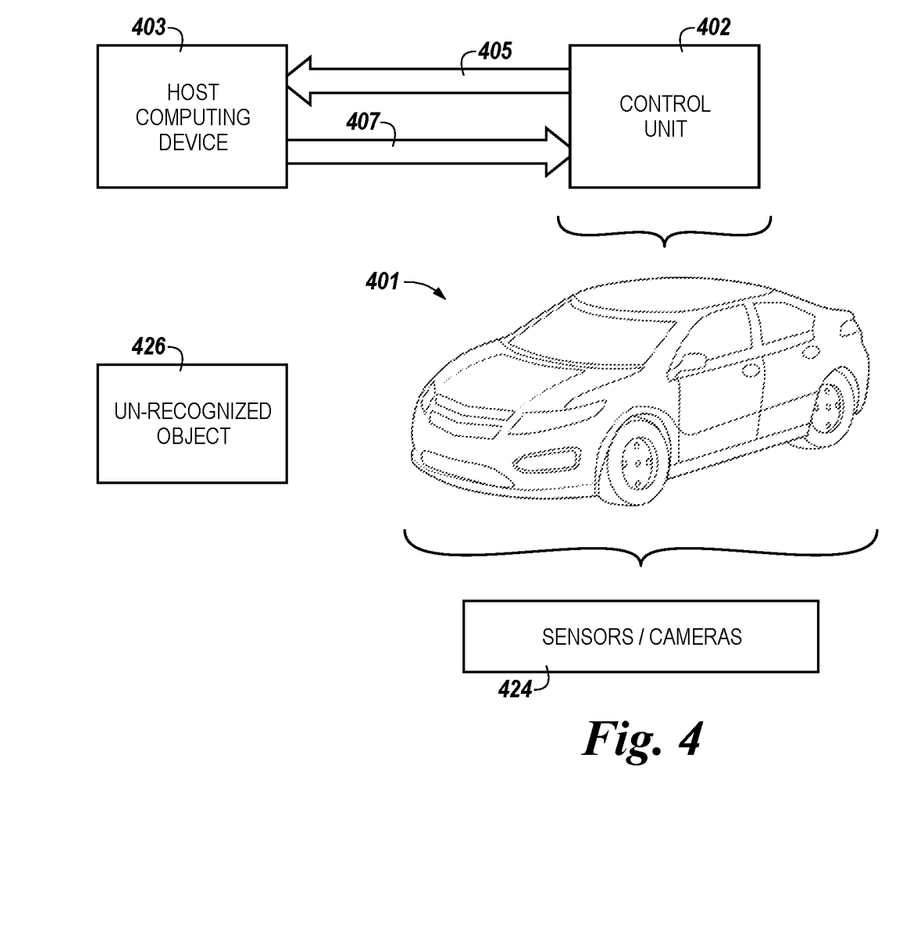
FIG. 4 is a diagram of an autonomous vehicle encountering an un-recognized object in accordance with a number of embodiments of the present disclosure.

FIG. 4 is another diagram of an autonomous vehicle encountering an un-recognized object in accordance with a number of embodiments of the present disclosure. As shown in FIG. 4, an autonomous vehicle 401 includes a control unit 402 and a plurality of sensors/cameras 424. The control unit is in communication with a host computing device 403 via communication paths 405 and 407. The communication paths 405 and 407 represent wireless communication paths between the control unit 402 and the host computing device 403. Although not shown in FIG. 4, the autonomous vehicle 401 and/or the host computing device 403 may include a gateway (e.g., gateway 316 illustrated in FIG. 3, herein). Further, although not shown in FIG. 4, the control unit 402 may store a private key such as private key 109 illustrated and discussed in connection with FIG. 1, herein.

During operation of the autonomous vehicle 401, an un-recognized object 426 may be detected by the sensors/cameras 424. The un-recognized object 426 may be an object that has not been previously detected by the sensors/cameras 424 of the autonomous vehicle 401, or the un-recognized object 426 may be an object that the neural network (e.g., neural network 310 illustrated in FIG. 3) of the control unit 402 has not learned about.

As an example, the un-recognized object 426 may be a child walking on their legs and hands, which may appear similar to, but not the same as objects recognized by the autonomous vehicle 401. For example, the child walking on their hands and legs may appear similar to a dog or other four-legged creature (which may be an object that is recognized by the autonomous vehicle 401), but the autonomous vehicle 401 may detect enough differences between the known four-legged creature and the child walking on the hands and legs to determine that the child walking on their hands and legs is an un-recognized object. Examples are not so limited, however, and the un-recognized object 426 may be an obstruction in the road such as a boulder or other debris that the autonomous vehicle 401 has detected via its sensors/cameras 424.

Responsive to determining that the un-recognized object 426 is in the path of the autonomous vehicle 401, the control unit 402 can generate a secure communication to transmit to the host computing device 403. The secure communication may include data collected by the autonomous vehicle 401 (e.g., data corresponding to the un-recognized object 426 collected from the sensors/cameras 424), one or more authentication protocols, and/or a message authentication code, as described in more detail in connection with FIG. 5A, herein. In some embodiments, the one or more authentication protocols may include an anti-replay protocol and/or the message authentication code may comprise a hash-based message authentication code (HMAC) or other suitable message authentication code based on the private key.

Once the secure communication is received by the host computing device 403, the host computing device 403 can analyze the data collected by the autonomous vehicle 403 to determine what the un-recognized object 426 is. For example. The host computing device 403 can transmit updated data based on the analysis to the control unit 402 of the autonomous vehicle 401. In some embodiments, the updated data can be stored in a matrix and, once it is received by the autonomous vehicle 401, can be stored in a data storage matrix (e.g., data storage matrix 312 illustrated in FIG. 3, herein). In some embodiments, the updated data can be stored in a weighing matrix and the values of the weighing matrix can represent firmware associated with the neural network (e.g., neural network 310 illustrated in FIG. 3, herein). The weighing matrix may be used to update the neural network of the autonomous vehicle 401 such that the autonomous vehicle 401 is able to learn about and/or identify the previously un-recognized object 426.

Figure 5A:
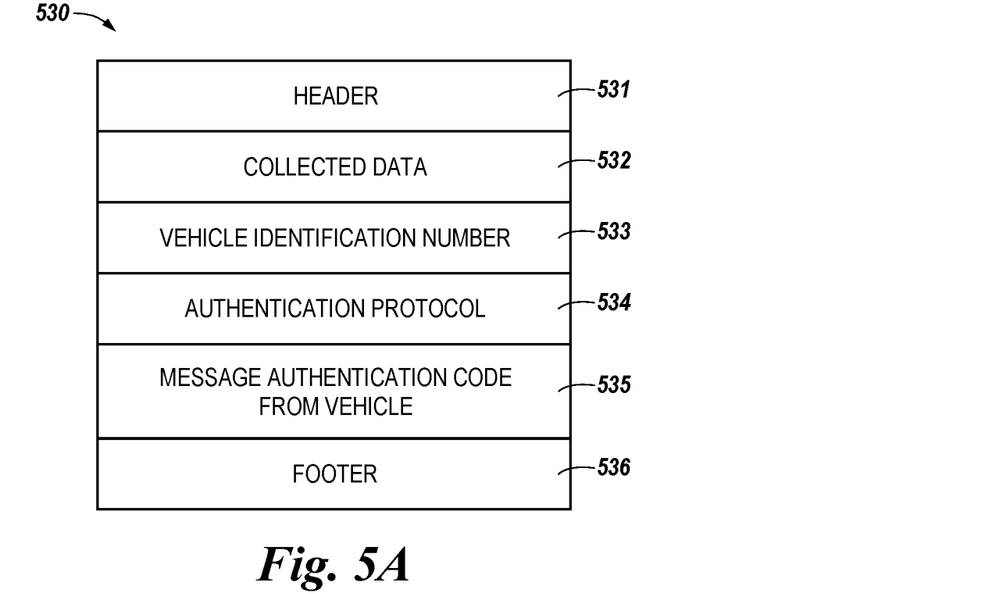
FIG. 5A is a block diagram of an example secure message generated by a control unit in accordance with a number of embodiments of the present disclosure.

FIG. 5A is a block diagram representing a secure communication 530 in accordance with a number of embodiments of the present disclosure. The secure communication 530 shown in FIG. 5A is an example of a secure communication 530 that is generated by the autonomous vehicle (e.g., autonomous vehicle 301 illustrated in FIG. 3). In some embodiments, the secure communication 530 may be transmitted to the host computing device (e.g., host computing device 403 illustrated in FIG. 4).

The secure communication 530 may include a header 531. The header 531 may include supplemental data placed at the beginning of the secure communication 530. The header 531 may include control information to provide for delivering the secure communication 530, for example.

The secure communication 530 may further include collected data 532. The collected data 532 may be data collected by the sensors/cameras (e.g., sensors/cameras 424 illustrated in FIG. 4) of an autonomous vehicle (e.g., autonomous vehicle 401 illustrated in FIG. 4). In some embodiments, the collected data 532 may include data corresponding to un-recognizable objects (e.g., un-recognizable object 426 illustrated in FIG. 4) detected by the autonomous vehicle in the course of operating the autonomous vehicle.

The secure communication 530 may further include a vehicle identification number (VIN) 533 associated with the autonomous vehicle. The VIN 533 may be used to identify the particular vehicle from which the secure communication 530 originated. In some embodiments, the VIN 533 may be concatenated with (e.g., on top of) the collected data 532.

The secure communication 530 may further include an authentication protocol 534. In some embodiments, the authentication protocol 534 may comprise an anti-replay authentication protocol. The authentication protocol 534 may be provided to alleviate the risk of man-in-the-middle or other malicious packet injection attacks. In some embodiments, the authentication protocol 534 may be uniquely generated each time the control unit (e.g., control unit 302 illustrated in FIG. 3) generates the secure message 530. In some embodiments, the authentication protocol 534 may be concatenated with (e.g., on top of) the VIN 533 and/or collected data 532.

In some embodiments, the authentication protocol 534 may include additional fields. The additional fields may include information to indicate a "freshness" of the message (e.g., to indicate that the message was generated at or within a particular time period) and/or the additional fields may include one or more anti-replay protocols to alleviate the risk of a man-in-the-middle attack, for example. For example, the authentication protocol 534 may include a timestamp indicating when the secure message 530 was generated or transmitted. For example, a secure timestamp may be generated and included as part of the authentication protocol 534 as part of an anti-replay protocol. In some embodiments, the authentication protocol 534 may include a random value (e.g., a cryptographic nonce). The cryptographic nonce may be a random or pseudo-random value that is generated for one time use and included as part of the authentication protocol 534 as part of an anti-replay protocol. In some embodiments, the authentication protocol 534 may include a count value that is incremented (e.g., monotonically) as each secure message 530 is generated. For example, a value associated with the monotonic counter may be included in the authentication protocol 534 as part of an anti-replay protocol. In some embodiments, the authentication protocol 534 may be stored in a memory resource such as memory resource 106 illustrated in FIG. 1, herein.

The secure communication 530 may further include a message authentication code (MAC) from the vehicle 535. The MAC from the vehicle 535 may comprise information to authenticate the secure communication 530. In some embodiments, the MAC from the vehicle 535 may be a hash-based message authentication code (HMAC) or any other suitable MAC based on the private key. The MAC from the vehicle 535 may be generated by the control unit (e.g., control unit 302 illustrated in FIG. 3). In some embodiments, the MAC from the vehicle 535 may be generated based on the private key (e.g., private key 109 illustrated in FIG. 1). In some embodiments, the MAC from the vehicle 535 may be concatenated with (e.g., on top of) the authentication protocol 534, the VIN 533, and/or the collected data 532.

The secure communication 530 may further include a footer 536. In some embodiments, the footer 536 may include information related to handling the secure communication 530, and/or the footer 536 may include information signifying the end of the secure communication 530. In some embodiments, the footer 536 may include information concerning the destination of the secure communication 530.

Figure 5B:
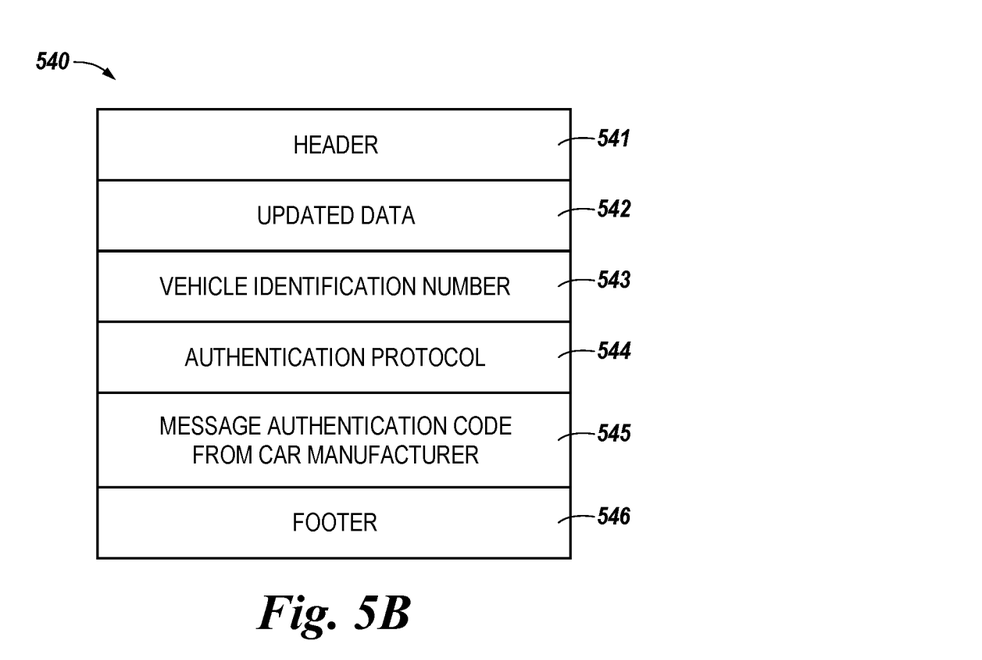
FIG. 5B is a block diagram of an example secure message generated by a host computing device in accordance with a number of embodiments of the present disclosure.

FIG. 5B is another block diagram representing a secure communication in accordance with a number of embodiments of the present disclosure. The secure communication 540 shown in FIG. 5B is an example of a secure communication 530 that is generated by the host computing device (e.g., host computing device 203 illustrated in FIG. 2). In some embodiments, the secure communication 540 may be transmitted from the host computing device to the autonomous vehicle.

The secure communication 540 may include a header 541. The header 541 may include supplemental data placed at the beginning of the secure communication 540. The header 541 may include control information to provide for delivering the secure communication 540, for example.

The secure communication 540 may further include updated data 542. The updated data 542 may include data resulting from analysis of the data collected by the autonomous vehicle (e.g., collected data 532 illustrated in FIG. 5A). In some embodiments, the updated data 542 may include data corresponding to an un-recognized object detected by the autonomous vehicle. For example, the updated data 532 may include new data that may be used to update the neural network (e.g., neural network 310 illustrated in FIG. 3) of the autonomous vehicle.

The secure communication 540 may further include the VIN 543. The VIN 543 may be used to identify the particular vehicle to which the secure communication 540 is destined. In some embodiments, the VIN 543 may be concatenated with (e.g., on top of) the updated data 542.

The secure communication 540 may further include an authentication protocol 544. In some embodiments, the authentication protocol 544 may comprise an anti-replay authentication protocol. The authentication protocol 544 may be provided to alleviate the risk of man-in-the-middle or other malicious packet injection attacks. In some embodiments, the authentication protocol 544 may be uniquely generated each time the host computing device (e.g., host computing device 203 illustrated in FIG. 3) generates the secure message 540. In some embodiments, the authentication protocol 544 may be concatenated with (e.g., on top of) the VIN 543 and/or the updated data 542.

The authentication protocol 544 may include additional fields. For example, the authentication protocol 544 may include a timestamp indicating when the secure message 540 was generated or transmitted. In some embodiments, the authentication protocol 544 may include a random value (e.g., a cryptographic nonce). In some embodiments, the authentication protocol 544 may include a count value that is incremented (e.g., monotonically) as each secure message 540 is generated The secure message 540 may further include a message authentication code (MAC) from the vehicle manufacturer 545. The MAC from the vehicle manufacturer 545 may comprise information to authenticate the secure communication 540. In some embodiments, the MAC from the vehicle manufacturer 545 may be a hash-based message authentication code (HMAC) or other suitable MAC based on the private key. The MAC from the vehicle manufacturer 545 may be generated by the host computing device when the secure message 540 is generated. In some embodiments, the MAC from the vehicle manufacturer 545 may be concatenated with the authentication protocol 544, the VIN 543 and/or the updated data 542.

The secure message 540 may further include a footer 546. In some embodiments, the footer 546 may include information related to handling the secure communication 540, and/or the footer 546 may include information signifying the end of the secure communication 540. In some embodiments, the footer 546 may include information concerning the destination of the secure communication 540.

Figure 6:
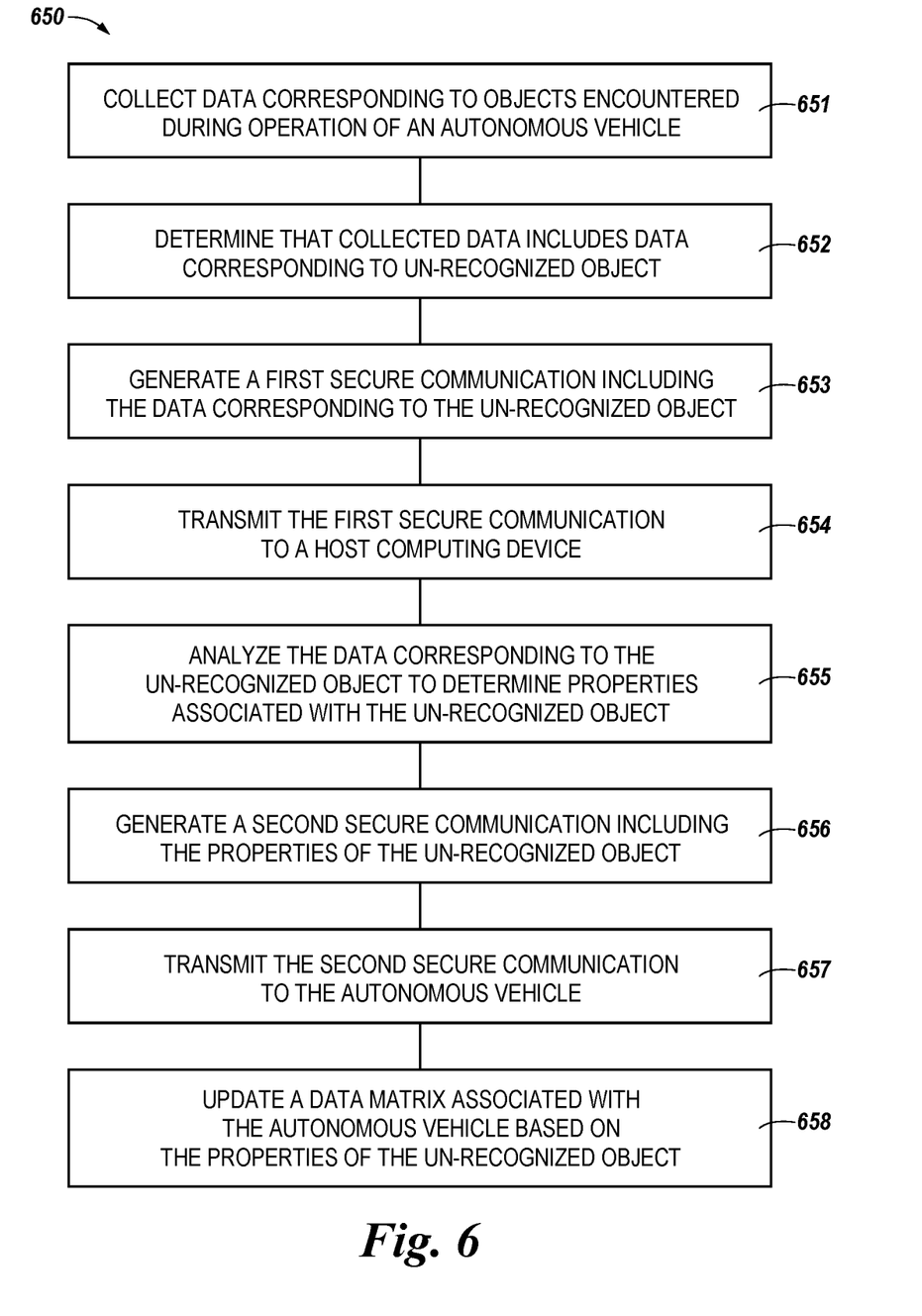
FIG. 6 is a flow diagram in accordance with a number of embodiments of the present disclosure.

FIG. 6 is a flow diagram 650 in accordance with a number of embodiments of the present disclosure. At block 651, data corresponding to objects encountered during operation of an autonomous vehicle may be collected. The data may be collected from sensors and/or cameras coupled to the autonomous vehicle as described in connection with FIGS. 3 and 4, herein. In some embodiments, the data corresponding to objects encountered during operation of an autonomous vehicle may include data corresponding to un-recognizable objects detected by the autonomous vehicle.

At block 652, it may be determined that the collected data includes data corresponding to an un-recognized object. For example, the collected data may include one or more un-recognizable objects, and the control unit (e.g., control unit 302 illustrated in FIG. 3) may determine that such un-recognized objects have been detected by the sensors and/or cameras of the autonomous vehicle.

At 653 a first secure communication including the data corresponding to the un-recognized object may be generated. In some embodiments, the first secure communication may be generated by a control unit (e.g., control unit 302 illustrated in FIG. 3, herein) associated with the autonomous vehicle. The first secure communication may be a secure message as described in connection with FIG. 5A, herein.

At 654, the secure communication may be transmitted to a host computing device. For example, the first secure communication may be transmitted from the autonomous vehicle to the host computing device. In some embodiments, the first secure communication may be transmitted from the autonomous vehicle to the host computing device via a network gateway (e.g., gateway 316 illustrated in FIG. 3, herein).

At 655, the data corresponding to the un-recognized object may be analyzed to determine properties associated with the un-recognized object. For example, the host computing device may analyze the data corresponding to the un-recognized object to determine what the un-recognized object is.

At 656, a second secure communication including the properties of the un-recognized object may be generated. In some embodiments, the properties of the un-recognized object may be organized in a data storage matrix such as a weighing matrix. The data contained in the data storage matrix may correspond to the firmware of the autonomous vehicle's neural network (e.g., neural network 310 illustrated in FIG. 3, herein) and may be used to update the firmware of the neural network such that the neural network can recognize the un-recognized object or learn about the un-recognized object through training.

At 657, the second secure communication may be transmitted to the autonomous vehicle. In some embodiments, the second secure communication may be generated by the host computing device (e.g., host computing device 203 illustrated in FIG. 2, herein). The second secure communication may be a secure message as described in connection with FIG. 5B, herein.

At 658, a data matrix associated with the autonomous vehicle may be updated based on the properties of the un-recognized object. In some embodiments, the data matrix may be used to update the neural network of the autonomous vehicle such that the neural network can recognize the un-recognized object or learn about the un-recognized object through training.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory resource configured to:
      store a private key associated with a vehicle; and
      store a weighing matrix comprising data corresponding to operation of the vehicle; and
   a processing resource coupled to the memory resource, wherein the processing resource is configured to:
      generate a first secure message comprising data corresponding to the vehicle and the private key and a message authentication code (MAC) based on the private key and an authentication protocol concatenated with the data corresponding to the vehicle and the private key;
      transmit the first secure message;
      receive a second secure message comprising an updated weighing matrix concatenated with the authentication protocol and the MAC; and
      update the weighing matrix based, at least in part, on the updated weighing matrix.

2. The apparatus of claim 1, wherein the private key is generated based on a vehicle identification number assigned to the vehicle.

3. The apparatus of claim 1, wherein the authentication protocol is an anti-replay protocol.

4. The apparatus of claim 1, wherein the authentication protocol includes at least one of a timestamp, a cryptographic nonce value, a monotonically incrementable counter, or combinations thereof.

5. The apparatus of claim 1, wherein the processing resource is further configured to re-generate the authentication protocol prior to transmitting the first secure message.

6. The apparatus of claim 1, wherein the data corresponding to the vehicle includes data collected from vehicle sensors, photographic data collected from vehicle cameras, or combinations thereof.

7. The apparatus of claim 1, wherein the private key is not transferred via a communication bus coupled to the processing resource and the memory resource.

8. An apparatus, comprising:
a host computing device including a processing resource and a memory resource, wherein the host computing device is configured to:
store a private key associated with a vehicle;
store a weighing matrix comprising data corresponding to operation of the vehicle;
receive a first secure message from the vehicle, the first secure message comprising data collected by the vehicle and a message authentication code (MAC) based on a vehicle identification number associated with the vehicle and a private key assigned to the vehicle, wherein the private key is stored in the memory resource; and
transmit, to the vehicle, a second secure message comprising an updated weighing matrix responsive to receipt of the first secure message.

9. The apparatus of claim 8, wherein:
the first secure message comprises a message authentication code (MAC) based on the private key and an authentication protocol including an anti-replay mechanism concatenated with the data corresponding to the vehicle; and
the second secure message comprises the authentication protocol, and the MAC concatenated with the updated weighing matrix.

10. The apparatus of claim 8, wherein the host computing device is configured to generate the updated weighing matrix based on the received data collected by the vehicle.

11. The apparatus of claim 8, wherein the data corresponding to the vehicle includes data corresponding to unrecognizable objects detected by the vehicle, and wherein the data is collected from vehicle sensors and photographic data.

12. The apparatus of claim 8, wherein the private key is based, at least in part, on a vehicle identification number associated with the vehicle and wherein the private key is assigned to the vehicle and stored in the memory resource when the vehicle is made.

13. The apparatus of claim 8, wherein the private key is modifiable, but is not readable.

14. A system, comprising:
an artificial intelligence electronic control unit (ECU) disposed in a vehicle, the ECU comprising a controller and a memory resource, wherein the controller is configured to cause:
a first secure message including data collected by the vehicle to be transmitted to a host computing device communicatively coupled to the ECU via a gateway, wherein the host computing device is configured to transmit a second secure message including a weighing matrix to the ECU responsive to receipt of the first secure message; and
the second secure message to be processed to update the ECU using the received weighing matrix.

15. The system of claim 14, the data collected by the vehicle includes data corresponding to unrecognizable objects detected by the vehicle.

16. The system of claim 14, wherein the controller is configured to cause:
the first secure message to be encrypted using a hash-based message authentication code; and
the second message to be decrypted prior to updating the ECU using the received weighing matrix.

17. The system of claim 14, wherein the controller includes a hardware based artificial neural network.

18. The system of claim 17, wherein values associated with the weighing matrix represent firmware of the artificial neural network.

19. A method, comprising:
determining, by a plurality of sensors coupled to a vehicle, that at least one sensor among the plurality of sensors has detected an un-recognized object;
generating a first secure message comprising data corresponding to the un-recognized object;
transmitting the first secure message to a host computing device external to the vehicle; and
receiving, at the vehicle, a second secure message comprising updated data corresponding to the un-recognized object; and
updating firmware associated with the vehicle using the updated data.

20. The method of claim 19, wherein the first secure message further includes a message authentication code (MAC) and an authentication protocol concatenated with the data corresponding to the un-recognized object.

21. The method of claim 20, wherein the MAC is generated using a vehicle identification number corresponding to the vehicle, a private key corresponding to the vehicle, or combinations thereof.

22. The method of claim 19, wherein the second secure message further includes a message authentication code (MAC) and an authentication protocol concatenated with the updated data, and wherein the authentication protocol includes an anti-replay mechanism.

23. The method of claim 19, wherein the updated data is stored in a weighing matrix corresponding to firmware of an artificial neural network associated with the vehicle.

24. An apparatus, comprising:
a memory resource configured to:
store a private key associated with a vehicle; and
store a matrix comprising data corresponding to operation of the vehicle; and
a processing resource coupled to the memory resource, wherein the processing resource is configured to:
generate a first secure message comprising data corresponding to the vehicle and the private key, wherein the data corresponding to the vehicle includes data collected from vehicle sensors, photographic data collected from vehicle cameras, or combinations thereof;
transmit the first secure message;
receive a second secure message comprising an updated matrix; and
update the matrix based, at least in part, on the updated matrix.

25. An apparatus, comprising:
a host computing device including a processing resource and a memory resource, wherein the host computing device is configured to:
store a matrix comprising data corresponding to operation of a vehicle;
receive a first secure message from the vehicle, the first secure message comprising data collected by the vehicle; and transmit, to the vehicle, a second secure message comprising an updated matrix responsive to receipt of the first secure message; and generate the updated matrix based on the received data collected by the vehicle.

26. An apparatus, comprising:

a host computing device including a processing resource and a memory resource, wherein the host computing device is configured to:

store a matrix comprising data corresponding to operation of a vehicle;

receive a first secure message from the vehicle, the first secure message comprising data collected by the vehicle, a message authentication code (MAC) based on the private key, and an authentication protocol including an anti-replay mechanism concatenated with the data corresponding to the vehicle; and transmit, to the vehicle, a second secure message comprising an updated matrix, the authentication protocol, and the MAC concatenated with the updated matrix responsive to receipt of the first secure message.

* * * * *